C. C. HARTPENCE.
COTTON SEED PLUG.
APPLICATION FILED AUG. 6, 1915.
1,191,001.
Patented July 11, 1916.
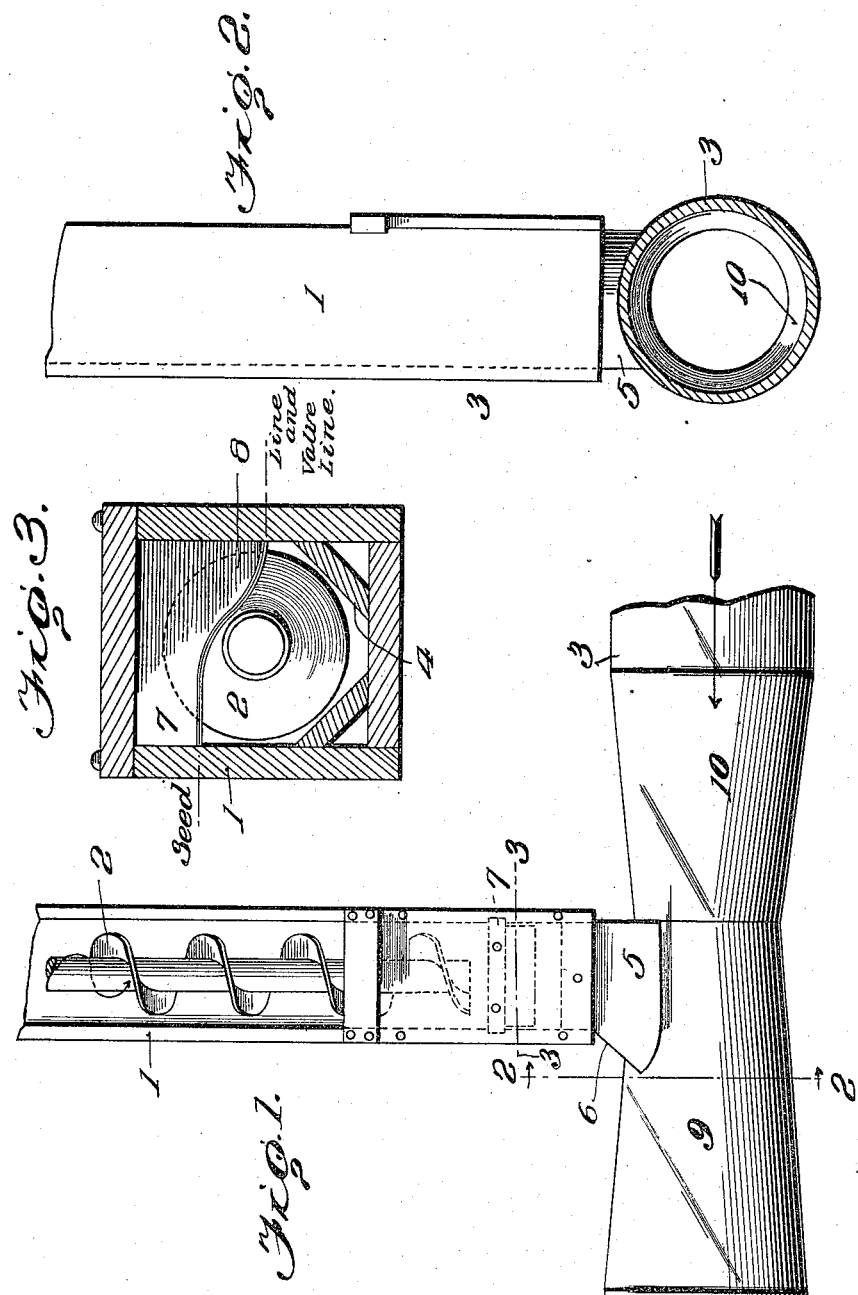

UNITED STATES PATENT OFFICE.

CHARLES C. HARTPENCE, OF COLUMBUS, GEORGIA, ASSIGNOR TO LUMMUS COTTON GIN COMPANY, OF COLUMBUS, GEORGIA, A CORPORATION OF GEORGIA.

COTTON-SEED PLUG.

1,191,001.  Specification of Letters Patent.  Patented July 11, 1916.

Application filed August 6, 1915. Serial No. 44,036.

*To all whom it may concern:*

Be it known that I, CHARLES C. HART-PENCE, of Columbus, in the county of Muscogee and State of Georgia, have invented certain new and useful Improvements in Cotton-Seed Plugs; and I do hereby declare the following to be a full, clear, and exact description of the invention, such as will enable others skilled in the art to which it appertains to make and use the same.

The seed from ginned cotton is usually carried from the gin by a conveyer or other means and discharged into an air pipe or flue from whence the seed is delivered to a seed bin or other receptacle, the conveyer tube being connected with the side of the air pipe. The air pipe, which may also carry the discharge from the elevator fan, usually has several inches of static pressure therein and this pressure has a deterring effect upon the flow of the seed into the pipe from the conveyer, causing a clogging of the latter and back flow of air in the conveyer.

The object of this invention is to provide an improved, simple and highly efficient connection between the cotton seed conveyer and the air pipe which will overcome the difficulties heretofore encountered and permit of the ready discharge of the seed from a conveyer into a current of air which will carry the seed to the seed bin or seed house.

In the accompanying drawings, Figure 1 is a plan view showing portions of a conveyer tube and an air pipe leading from a fan. Fig. 2 is a sectional view on line 2—2, Fig. 1. Fig. 3 is a similar view on line 3—3, Fig. 1.

Referring to the drawings, 1 designates a conveyer tube or housing which may be connected in any preferred manner with one or more gins, not shown, and 2 the conveyer within the tube. The housing may be of any preferred shape. I have shown it of rectangular form in cross section and provided with a trough 4 formed by inclined portions of its side walls. The housing is connected to one side of an air pipe or flue 3 by a thimble 5. The thimble is formed with three walls parallel with the axis of the housing and one diverging or flaring wall as 6, this being on the far side of the thimble with reference to the direction of flow through the air pipe. In consequence the flow from the conveyer is in a direction which gradually coincides with that of the air pipe instead of being at right angles thereto.

To guard against deflection of the air currents from the air pipe 3 into the conveyer housing I provide the latter with a valve 7 at its point of connection with the thimble. This valve is preferably formed of flexible material and has a flap-like portion 8 which is held against the seed in the trough by the air pressure in the thimble, the seed normally rising to the height indicated in Fig. 3. The seed may readily be forced under the valve but the peculiar formation of the latter prevents back flow of the air.

The air in pipe 3 has two pressures, first, the static or bursting pressure, and, secondly, the velocity pressure. The static pressure if not reduced will enter the conveyer and act against the seed and tend to clog the conveyer and there will also be a tendency toward back pressure in the conveyer. This difficulty I overcome partly by the thimble construction as described and partly by a gradual diminution of the cross sectional area of the air pipe as indicated at 10, from a point slightly in rear of the point of connection with the thimble 5, and then gradually increasing the area of the pipe, as at 9, the point of connection with the thimble 5 being wholly within the gradually increasing area. By this construction a large portion of the static pressure is changed into velocity pressure enabling the seed to be easily forced into the air stream without danger of clogging the end of the conveyer. At the point of entrance of the seed into the air stream the velocity pressure is being changed back into static pressure to the extent necessary to make the air continue to flow. The seed will thus readily pass with the current into the seed bin or seed house.

The advantages of my invention will be apparent. It will be seen that I have provided a very simple and efficient means for insuring a quick and easy passage of the seed from a conveyer to a discharge pipe and through the latter to a receptacle, all danger of clogging of the parts being avoided.

I claim as my invention:

1. Conveyer mechanism comprising a conveyer, a discharge pipe adapted to conduct a current of air, a connection between said conveyer and said pipe, the cross sectional area of said pipe being gradually decreased to the point of said connection and gradually increased from said point, said connection being wholly within the gradually increasing portion of the restricted section of said pipe.

2. Conveyer mechanism comprising a conveyer, a discharge pipe adapted to conduct a current of air, a connection between said conveyer and said pipe, said pipe being constricted to the point of said connection and gradually expanded to its normal area at and beyond said connection, said connection between said conveyer and said pipe being wholly within the expanded portion of the latter, and a flexible valve within said conveyer for preventing back flow therein.

3. Cotton seed conveying mechanism comprising a conveyer and a discharge pipe connected to the extremity of said conveyer and adapted to conduct a current of air, the cross sectional area of said pipe being gradually decreased to the point of connection with said conveyer and gradually increased from said point, the connection between said conveyer and said pipe being wholly within the gradually increasing area of the latter, and the farther wall of the extremity of said conveyer, relatively to the direction of flow through said pipe, being flared relative to the axis of said conveyer.

4. In a cotton seed conveying mechanism the combination with an air pipe and a conveyer in communication therewith, said pipe having its walls gradually converging in advance of said conveyer and gradually diverging at and beyond the intersection of said conveyer, of a thimble constituting the connection between said conveyer and said pipe, said thimble having its nozzle opening into said pipe in a direction that gradually coincides with the flow through said pipe.

In testimony whereof I have signed this specification in the presence of two subscribing witnesses.

CHARLES C. HARTPENCE.

Witnesses:
 THOMAS O. OTT,
 J. F. RAY.

Copies of this patent may be obtained for five cents each, by addressing the "Commissioner of Patents, Washington, D. C."